United States Patent
Noguchi (10) Patent No.: US 8,653,777 B2
(45) Date of Patent: Feb. 18, 2014

(54) MOTOR DRIVING APPARATUS

(75) Inventor: Yoshiyasu Noguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 13/379,979

(22) PCT Filed: Jun. 22, 2009

(86) PCT No.: PCT/JP2009/061317
§ 371 (c)(1),
(2), (4) Date: Dec. 21, 2011

(87) PCT Pub. No.: WO2010/150339
PCT Pub. Date: Dec. 29, 2010

(65) Prior Publication Data
US 2012/0098475 A1 Apr. 26, 2012

(51) Int. Cl.
*H02P 7/00* (2006.01)

(52) U.S. Cl.
USPC ........................................ 318/479

(58) Field of Classification Search
None
See application file for complete search history.

(56) References Cited

U.S. PATENT DOCUMENTS

| 2002/0024317 A1* | 2/2002 | Amakusa et al. ............. 318/782 |
| 2002/0189480 A1 | 12/2002 | Ohno et al. |
| 2005/0093505 A1 | 5/2005 | Kameya |
| 2005/0184688 A1 | 8/2005 | Hirochi et al. |

FOREIGN PATENT DOCUMENTS

| DE | 10244765 A1 | 4/2003 |
| DE | 102004052652 A1 | 6/2005 |
| DE | 102005008505 A1 | 9/2005 |
| EP | 1614579 A2 | 1/2006 |
| JP | 62-210895 A | 9/1987 |
| JP | 8-9667 A | 1/1996 |
| JP | 8-98546 A | 4/1996 |
| JP | 2002-361838 A | 12/2002 |
| JP | 2006-296154 A | 10/2006 |

OTHER PUBLICATIONS

German Office Action issued in German Patent Application No. 11 2009 004 992.3, dated Jul. 31, 2012.
Korean Decision of Patent Grant, KPA No. 10-2011-7025386, Nov. 7, 2012.

* cited by examiner

Primary Examiner — Lincoln Donovan
Assistant Examiner — Zoheb Imtiaz
(74) Attorney, Agent, or Firm — Sughrue Mion, PLLC (57) ABSTRACT

A motor driving apparatus includes: a threshold providing circuit that provides a plurality of power failure detection thresholds determined according to an installation environment of the motor driving apparatus, a selection circuit that selects a specified power failure detection threshold from the power failure detection thresholds, and a comparison and determination circuit that determines presence or absence of an occurrence of power failure by comparing a detected voltage of an alternating-current power input to a motor driving circuit and the selected power failure detection threshold. Consequently, it is possible to select the power failure detection threshold, which determines a detection reference of power failure in which alternating-current power input is interrupted, according to an installation environment, so that the abnormal end process in the case of an occurrence of power failure in which alternating-current power input is interrupted can be surely performed in any installation environment.

5 Claims, 5 Drawing Sheets

MOTOR DRIVING APPARATUS

CROSS REFERENCE TO RELATED APPLICATIONS

This application is a National Stage of International Application No. PCT/JP2009/061317, filed on Jun. 22, 2009, the contents of all of which are incorporated herein by reference in their entirety.

FIELD

The present invention relates to a motor driving apparatus.

BACKGROUND

The motor driving apparatus is composed of a motor driving circuit functionally interposed between an alternating-current power source and a motor, a control circuit that calculates and generates a control signal that causes the motor driving circuit to drive the motor in a desired manner, and an operation power generating system for internal circuits. The operation power generating system for the internal circuits is configured to generate a control voltage necessary for the internal circuits, such as the control circuit and the driving circuit that generates a driving signal to a plurality of switching elements in the motor driving circuit from the control signal, from charge voltage of a smoothing capacitor that smoothes voltage obtained by rectifying alternating-current voltage supplied from the alternating-current power source. With this power supply configuration, when a power failure in which alternating-current power is interrupted occurs, power supply to the internal circuits is not immediately interrupted and continues for a short time after the power failure by the energy stored in the smoothing capacitor.

The motor driving apparatus incorporated in a machining apparatus has a configuration in which, with the use of this power supply configuration, the control circuit forcibly stops the motor for preventing damage or the like of the machining apparatus by the motor that rotates by inertia when a power failure in which alternating-current power input is interrupted occurs.

Specifically, the control circuit is configured to monitor changes in the charging voltage of the smoothing capacitor in parallel with calculation output control of a control signal to the motor driving circuit with the control voltage generated from the charging voltage of the smoothing capacitor as an operating voltage, and to determine when detecting that the charging voltage has become low voltage below a threshold, that occurrence of a power failure has been detected, and perform an abnormal end process of calculating and generating a control signal that forcibly stops the motor and outputting it to the driving circuit in the motor driving circuit by the time the charging voltage of the smoothing capacitor drops to near the voltage (that is, the voltage at which the control circuit becomes inoperable) at which the control voltage cannot be generated.

CITATION LIST

Non Patent Literature

Patent Literature 1: Japanese Patent Application Laid-open No. 2006-296154

SUMMARY

Technical Problem

However, characteristics of a motor used in a machining apparatus in which the motor driving apparatus is incorporated vary, and moreover, a power supply environment in which the machining apparatus and the like are used varies, so that, for example, there is a case in which execution time for the above-described abnormal end process cannot be ensured as shown below.

Specifically, in some cases, a machining apparatus is configured such that external equipments such as a fan and a pump are also connected to an alternating-current power source connected to the motor driving apparatus. Some motors used for the fan and the pump perform a power generating operation while continuing to rotate by inertia immediately after the power failure.

In such a case, an alternating-current voltage supplied to the motor driving apparatus gradually decreases rather than sharply decreases to a zero level by this occurrence of power failure, so that the charging voltage of the smoothing capacitor also decreases gradually. That is, the detection timing of the low voltage for determining the occurrence of power failure described above is more delayed than the case where a fan, a pump, and the like are not apposed. Energy remaining in the smoothing capacitor at this time has decreased to an amount equal to or lower than an amount necessary for generating the control voltage until completing the abnormal end process, so that the time for executing the abnormal end process cannot be ensured.

When a power failure occurs, in order to enable to surely perform the abnormal end process in any installation environment, it is needed to lengthen the time until the timing at which the charging voltage of the smoothing capacitor drops to near voltage at which the control voltage cannot be generated from the detection timing of the low voltage for determining the occurrence of a power failure described above. However, when the capacitance of the smoothing capacitor is increased to cope with this, this causes an increase in geometry dimensions in addition to an increase in cost.

The present invention is achieved in view of the above, and it is an object of the present invention to obtain a motor driving apparatus that has a configuration by which an abnormal end process in the case of an occurrence of power failure in which alternating-current power input is interrupted can be surely performed in any installation environment.

Solution to Problem

In order to sole the aforementioned problems, a motor driving apparatus according to one aspect of the present invention is configured to include: a plurality of power failure detection thresholds determined according to an installation environment of the motor driving apparatus; a selection circuit that selects a specified power failure detection threshold from the power failure detection thresholds; and a comparison and determination circuit that determines presence or absence of an occurrence of power failure by comparing a detected voltage of an alternating-current power input to a motor driving circuit and the selected power failure detection threshold.

Advantageous Effects of Invention

The motor driving apparatus according to the present invention is configured to enable to select a power failure detection threshold, which regulates a detection reference of a power failure in which alternating-current power input is interrupted, according to an installation environment, so that such an effect is obtained that an abnormal end process in the case of occurrence of power failure can be surely performed in any installation environment.

DESCRIPTION OF EMBODIMENTS

Exemplary embodiments of a motor driving apparatus according to the present invention will be explained below in detail based on the drawings. This invention is not limited to the embodiments.

First Embodiment

Figure 1:
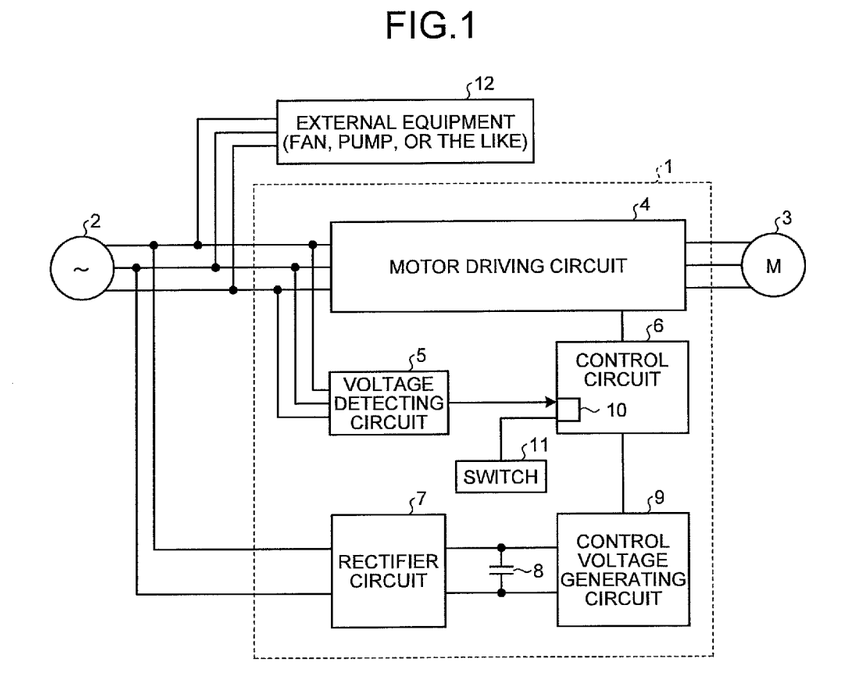
FIG. 1 is a block diagram illustrating a configuration of a motor driving apparatus according to a first embodiment of the present invention.

FIG. 1 is a block diagram illustrating a configuration of a motor driving apparatus according to the first embodiment of the present invention. A motor driving apparatus 1 according to the first embodiment shown in FIG. 1 is configured such that in addition to a motor driving circuit 4 interposed between an alternating-current power source 2 and a motor (M) 3, a voltage detecting circuit 5, a control circuit 6, a rectifier circuit 7, a smoothing circuit 8, and a control voltage generating circuit 9, a power-failure detection processing unit 10 adding a function to the control circuit 6 and a switch 11 associated with the power-failure detection processing unit 10 are also provided.

In FIG. 1, as an installation environment of a machining apparatus in which the motor driving apparatus 1 according to the first embodiment is incorporated, there is shown a case in which an external equipment 12, such as a fan and a pump, is also connected to the alternating-current power source 2 that the motor driving apparatus 1 uses.

The motor driving circuit 4 includes a full-wave rectifier circuit that performs full-wave rectification on a three-phase alternating-current voltage supplied from the three-phase alternating-current power source 2, a plurality of switching elements arranged between positive and negative buses connected to a positive side and a negative side of the full-wave rectifier circuit, and a driving circuit that causes the switching elements to switch a direct-current voltage between the positive and negative buses by a control signal from the control circuit 6, and supplies a driving current to the motor 3 to rotate the motor 3 at an arbitrary speed.

The rectifier circuit 7, for example, performs full-wave rectification on a two-phase voltage obtained from two-phase lines out of three-phase lines of the alternating-current power source 2. The smoothing circuit 8 smoothes a rectified voltage including ripples rectified by the rectifier circuit 7. The control voltage generating circuit 9 includes a DC-DC converter circuit and generates a control voltage necessary for the operation of internal circuits, such as the control circuit 6 and the driving circuit in the motor driving circuit 4, from a charging voltage of the smoothing circuit 8.

The voltage detecting circuit 5 includes a full-wave rectifier circuit that performs full-wave rectification on a three-phase alternating-current voltage supplied from the three-phase alternating-current power source 2, and outputs an output direct-current voltage of the full-wave rectifier circuit to the power-failure detection processing unit 10 in the control circuit 6 as a detected voltage value.

Figure 2:
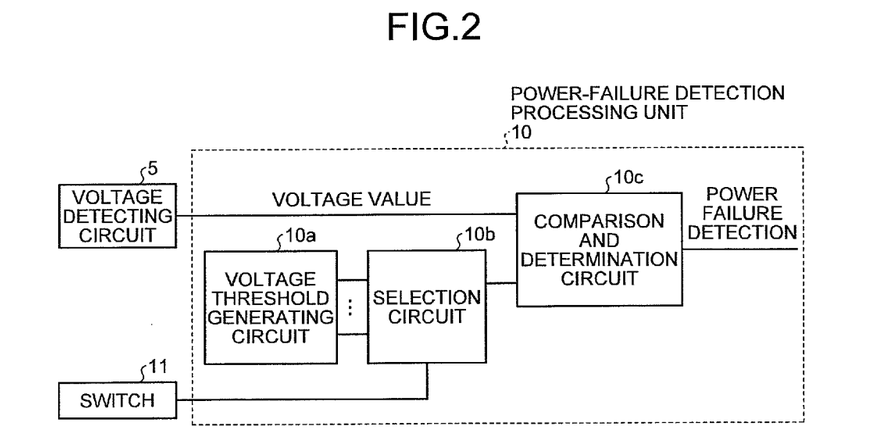
FIG. 2 is a block diagram illustrating a configuration example of a power-failure detection processing unit shown in FIG. 1.

FIG. 2 is a block diagram illustrating the configuration example of the power-failure detection processing unit shown in FIG. 1. As shown in FIG. 2, the power-failure detection processing unit 10 according to the first embodiment, for example, includes a voltage threshold generating circuit 10a, a selection circuit 10b, and a comparison and determination circuit 10c.

The voltage threshold generating circuit 10a is configured to enable to generate two or more voltage thresholds as power failure detection thresholds by a combination of a resistor voltage-divider provided between the control voltage generated by the control voltage generating circuit 9 and the ground and a zener diode. The voltage threshold value to be generated is determined mainly according to the installation environment of the motor driving apparatus 1. Specifically, as shown in FIG. 1, the voltage threshold value is determined according to whether or not the external equipment 12, such as a fan and a pump, is also connected to the alternating-current power source 2 to be used, the presence or absence of the regeneration capability of the motors of the fan and the pump in the case of being connected, the extent of the regeneration capability, and so on.

In terms of the number of types of the voltage thresholds, basically, two kinds, i.e., a first voltage threshold and a second voltage threshold, are sufficient. The first voltage threshold is applied, for example, when the external equipment 12 is not connected or when, although the external equipment 12 is connected, the regeneration capability of a motor used therein can be ignored. The second voltage threshold is applied, for example, when the external equipment 12 is connected and the regeneration capability of a motor used therein cannot be ignored. The magnitude relation in this case is (first voltage threshold)<(second voltage threshold).

However, when the external equipment 12 is connected and the regeneration capability of a motor used therein cannot be ignored, the voltage thresholds can be finely determined according to the trade-off between the capacity of the smoothing circuit 8 and the extent of the regeneration capability of a motor that the external equipment 12 uses. In other words, the second voltage threshold is divided into a plurality of values, while the above first voltage threshold is set as the lowest value. Consequently, in the environment in which the external equipment 12 is connected, it becomes possible to detect appropriate timing to start an abnormal end process more surely.

In the switch 11, it is preset at the time of apparatus installation that the voltage threshold determined to use according to the installation environment of the motor driving apparatus 1 is specified. The switch 11 can be a type in which the voltage threshold is specified in one-to-one relationship or a type in which one voltage threshold is specified by a digital value.

The selection circuit 10b selects one voltage threshold specified by the switch 11 from among two or more voltage thresholds generated by the voltage threshold generating circuit 10a and outputs it to the comparison and determination circuit 10c. The comparison and determination circuit 10c compares a voltage value detected by the voltage detecting circuit 5 with the voltage threshold from the selection circuit 10b, and, in the case of (voltage value)>(voltage threshold), determines that power failure does not occur and sets the output to, for example, a high level and, in the case of (voltage value)<(voltage threshold), determines that power failure occurs and sets the output to a low level in this example.

The control circuit 6 monitors changes in output of the power-failure detection processing unit 10, i.e., output changes of the comparison and determination circuit 10c, in parallel with calculation output control of a control signal to the motor driving circuit 4, setting the control voltage generated by the control voltage generating circuit 9 to be an operating voltage, determines that the occurrence of a power failure is detected when detecting that the output level becomes a low level, and performs the abnormal end process of calculating and generating a control signal that forcibly stops the motor 3 and outputting it to the driving circuit in the motor driving circuit 4.

It is additionally described just to make sure that although when alternating-current power source input is interrupted, in the motor driving circuit 4, the output of the full-wave rectifier circuit disappears and the bus voltage also disappears, so that the driving current from the switching elements to the motor 3 disappears, the motor 3 performs a power generating operation by a continuing rotation for a short time by inertia, so that the bus voltage is generated and the switching elements become a controllable state. Therefore, in the period in which the control voltage generating circuit 9 can generate the control voltage, if a control signal that forcibly stops the motor 3 is provided to the driving circuit in the motor driving circuit 4 from the control circuit 6, the motor 3 can be forcibly stopped.

Figure 3:
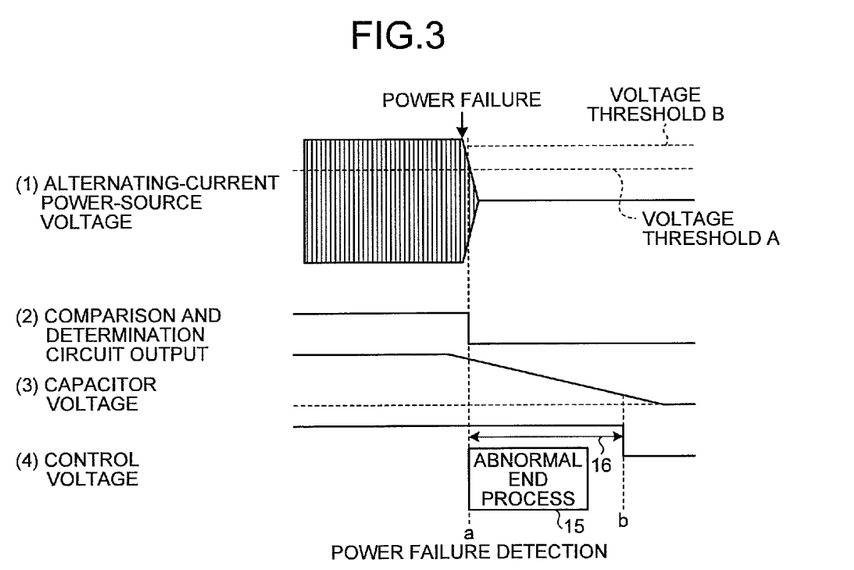
FIG. 3 is a time chart explaining an operation at the time of occurrence of a power failure when a smaller one of two voltage thresholds is selected.
Figure 4:
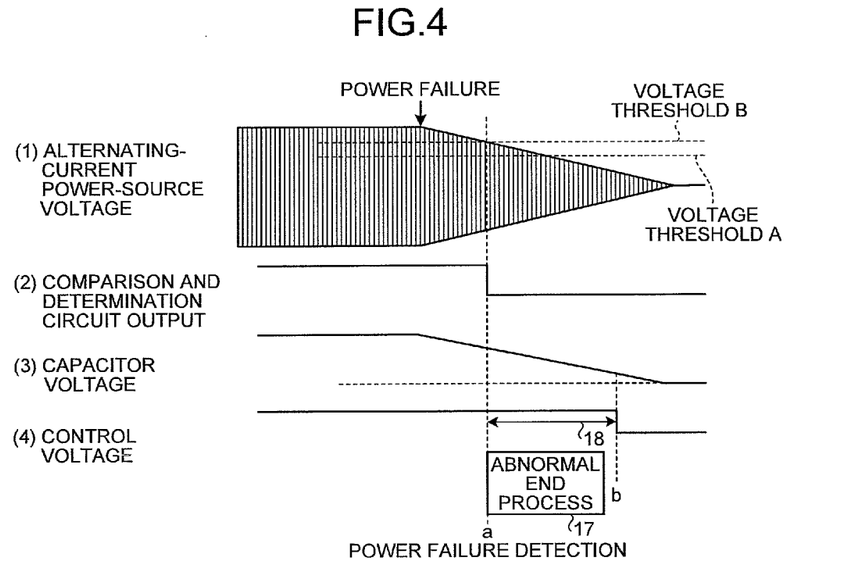
FIG. 4 is a time chart explaining an operation example at the time of occurrence of a power failure when a larger one of two voltage thresholds is selected.

Next, an operation at the time of occurrence of a power failure is explained by using FIG. 3 and FIG. 4, with reference to FIG. 1 and FIG. 2. FIG. 3 is a time chart explaining an operation at the time of occurrence of a power failure when a smaller one of two voltage thresholds is selected. FIG. 4 is a time chart explaining an operation example at the time of occurrence of a power failure when a larger one of two voltage thresholds is selected. FIG. 3 and FIG. 4 illustrate the operation in the case where the voltage threshold generating circuit 10a generates two voltage thresholds A and B. Among the two voltage thresholds A and B, the voltage threshold A corresponds to the first voltage threshold and the voltage threshold B correspond to the second voltage threshold.

In FIG. 3, in the case where the external equipment 12 is not connected or where, although the external equipment 12 is connected, the regeneration capability of a motor used therein can be ignored, as shown in FIG. 3 (1), when a power failure occurs, the voltage level of the alternating-current power source 2 input to the motor driving apparatus 1 drops rapidly toward a zero level. In such an installation environment, the switch 11 is set to specify the voltage threshold A with a smaller voltage value.

The comparison and determination circuit 10c compares the magnitude between the voltage value of the alternating-current power source 2 detected by the voltage detecting circuit 5 and the voltage threshold A selected by the selection circuit 10b, so that before a power failure occurs, the comparison and determination circuit 10c sets the output to a high level. When a power failure occurs, although the voltage threshold A is a smaller voltage level, the detected voltage of the voltage detecting circuit 5 falls below the voltage threshold A within a short time after the occurrence of power failure, so that the comparison and determination circuit 10c causes the output to fall to a low level within a short time after the occurrence of power failure (FIG. 3 (2)) and outputs a power failure detection a to the control circuit 6. The control circuit 6 starts an abnormal end process 15 in response to the power failure detection a (FIG. 3 (4)).

At this timing, as shown in FIGS. 3 (3) and (4), relatively large stored energy remains in the smoothing circuit 8, so that a period 16 to a timing b at which the control voltage generating circuit 9 cannot generate the control voltage from the charge voltage of the smoothing circuit 8 becomes longer than the period necessary for performing the abnormal end process 15.

The operation manner shown in FIG. 3 is a so-called standard operation. The capacitance value of the smoothing circuit 8 is typically determined so that the period 16 longer than the period necessary for performing the abnormal end process 15 can be ensured in the standard operation in the operation manner shown in FIG. 3. The voltage threshold A is set to a low voltage value with a margin ensured with respect to the range of the control voltage generated by the control voltage generating circuit 9 for preventing erroneous detection due to noise or the like.

Next, in FIG. 4, for example, in the case where the external equipment 12 is connected and the regeneration capability of a motor used therein cannot be ignored, as shown in FIG. 4 (1), when a power failure occurs, the voltage level of the alternating-current power source 2 input to the motor driving apparatus 1 drops moderately toward a zero level due to the effect of the regenerative power. In such an installation environment, the switch 11 is set to specify the voltage threshold B having a larger voltage value.

The comparison and determination circuit 10c sets the output to a high level before a power failure occurs. When a power failure occurs, because the voltage threshold B is a larger voltage level, the detected voltage of the voltage detecting circuit 5 falls below the voltage threshold B at an early timing after occurrence of the power failure, and the comparison and determination circuit 10c causes the output to fall to a low level (FIG. 4 (2)) and outputs the power failure detection a to the control circuit 6. The control circuit 6 starts an abnormal end process 17 in response to the power failure detection a (FIG. 4 (4)).

At this timing, as shown in FIGS. 4 (3) and (4), relatively large stored energy remains in the smoothing circuit 8, so that a period 18 to the timing b at which the control voltage generating circuit 9 cannot generate the control voltage from the charge voltage of the smoothing circuit 8 becomes longer than the period necessary for performing the abnormal end process 17. In this case, if the voltage threshold A is selected, the timing of detecting power failure by the voltage threshold A is delayed from the timing of detecting power failure by the voltage threshold B, so that the stored energy remaining in the smoothing circuit 8 has decreased significantly. Therefore, the period 18 becomes shorter than the period necessary for performing the abnormal end process 17 and the control circuit 6 becomes inoperable before completing the abnormal end process 17. Because it is set to select the voltage threshold B at the time of installation, the control circuit 6 can complete the abnormal end process 17 before becoming inoperable.

FIG. 2 illustrates the voltage threshold generating circuit 10*a* that generates two or more voltage thresholds by the combination of a resistor voltage divider and a zener diode, however, it is applicable that a voltage threshold storing circuit that stores two or more voltage thresholds in the form of digital values be used instead of the voltage threshold generating circuit 10*a*, and the comparison and determination circuit 10*c* include a D/A converter and perform comparison and determination after converting the voltage threshold in the form of a digital value input from the selection circuit 10*b* into an analog value. Moreover, it is applicable that the comparison and determination circuit 10*c* include an A/D converter and performs comparison and determination in the form of a digital value by a microcomputer or the like.

As explained above, according to the first embodiment, the voltage threshold, which determines the detection reference of a power failure due to interruption of alternating-current power input, can be selected according to the installation environment, so that the abnormal end process in the case of occurrence of power failure can be surely performed in any installation environment.

Second Embodiment

Figure 5:
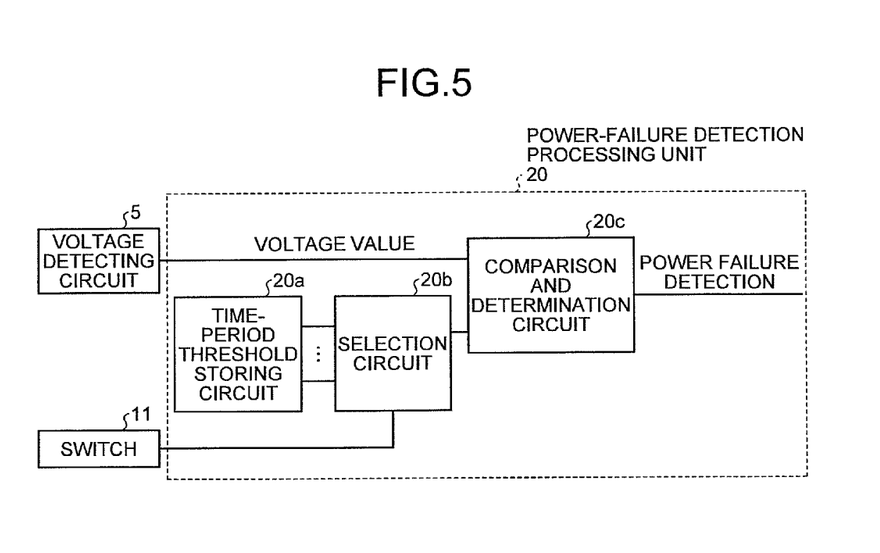
FIG. 5 is a block diagram illustrating another configuration example of the power-failure detection processing unit shown in FIG. 1 as a second embodiment of the present invention.

FIG. 5 is a block diagram illustrating another configuration example of the power-failure detection processing unit shown in FIG. 1 as the second embodiment of the present invention. As shown in FIG. 5, a motor driving apparatus according to the second embodiment is such that, in the configuration of the motor driving apparatus 1 shown in FIG. 1, a power-failure detection processing unit 20 with a changed reference numeral includes a time-period threshold storing circuit 20*a*, a selection circuit 20*b*, and a comparison and determination circuit 20*c*.

FIG. 3 (1) and FIG. 4 (1) shown above are voltage waveforms of alternating-current power input to the voltage detecting circuit 5. The input voltage at the time of an occurrence of power failure drops sharply in FIG. 3 (1) and drops moderately in FIG. 4 (1). The power-supply voltage detected by the voltage detecting circuit 5 is a direct-current voltage rectified by a full-wave rectifier circuit and a ripple component is superimposed on the direct-current voltage. The cycle of this ripple component at the time of occurrence of a power failure becomes short when the input voltage to the voltage detecting circuit 5 is the waveform shown in FIG. 3 (1) and becomes long when the input voltage to the voltage detecting circuit 5 is the waveform shown in FIG. 4 (1).

Therefore, in the time-period threshold storing circuit 20*a*, two or more time-period thresholds are stored as the power failure detection thresholds according to the installation environment. In the similar manner to the first embodiment, as shown in FIG. 1, the time-period threshold is determined according to whether or not the external equipment 12, such as a fan and a pump, is also connected to the alternating-current power source 2 to be used, the presence or absence of the regeneration capability of the motors of the fan and the pump in the case of being connected, the extent of the regeneration capability, and so on.

In terms of the number of types of the time-period thresholds, in the similar manner to the first embodiment, basically, two kinds, i.e., a first time-period threshold and a second time-period threshold are sufficient. The first time-period threshold is applied, for example, when the external equipment 12 is not connected or when, although the external equipment 12 is connected, the regeneration capability of a motor used therein can be ignored. The second time-period threshold is applied, for example, when the external equipment 12 is connected and the regeneration capability of a motor used therein cannot be ignored. The magnitude relation in this case is (first time-period threshold)<(second time-period threshold).

However, when the external equipment 12 is connected and the regeneration capability of a motor used therein cannot be ignored, the time-period threshold can be finely determined according to the trade-off between the capacity of the smoothing circuit 8 and the extent of the regeneration capability of a motor that the external equipment 12 uses. In other words, the second time-period threshold is divided into a plurality of values, while the above first time-period threshold is set as the lowest value. Consequently, in the environment in which the external equipment 12 is connected, it becomes possible to detect appropriate timing to start the abnormal end process more surely.

In the switch 11 in the second embodiment, it is preset at the time of apparatus installation that the time-period threshold determined to use according to the installation environment of the motor driving apparatus 1 is specified. The selection circuit 20*b* reads out one time-period threshold specified by the switch 11 from among two or more time-period thresholds stored in the time-period threshold storing circuit 20*a* and outputs it to the comparison and determination circuit 20*c*.

Figure 6:
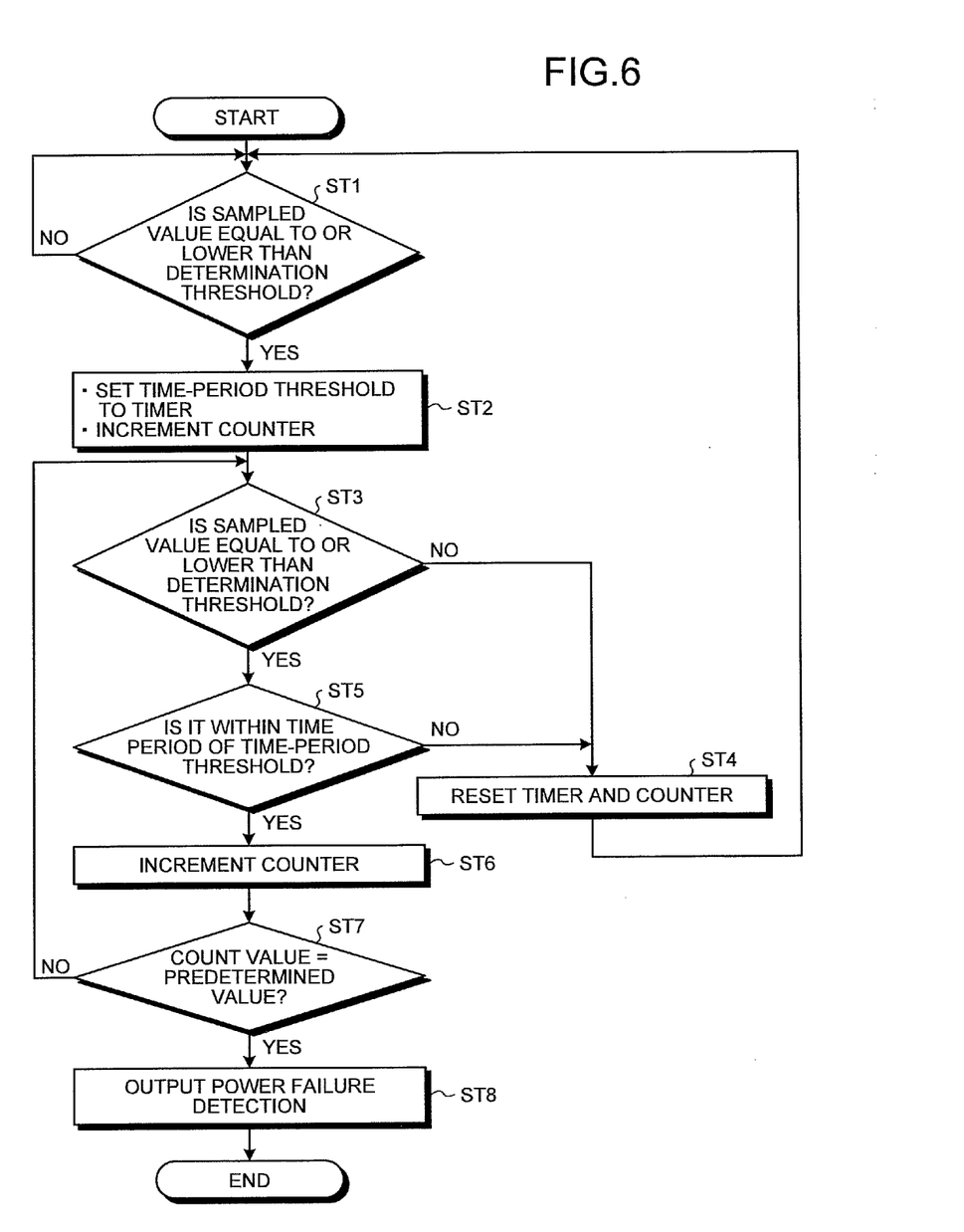
FIG. 6 is a flowchart explaining a configuration and the operation of a comparison and determination circuit shown in FIG. 5.

The comparison and determination circuit 20*c* performs power failure detection, for example, by the configuration and the procedure shown in FIG. 6. FIG. 6 is a flowchart explaining the configuration and the operation of the comparison and determination circuit shown in FIG. 5. First, the configuration is illustrated. In FIG. 6, the comparison and determination circuit 20*c* includes a sample and hold circuit that samples the power-supply voltage detected by the voltage detecting circuit 5 at predetermined intervals and holds it, a comparison circuit that compares the magnitude between a sampled value held in the sample and hold circuit and a predetermined determination threshold point by point, a timer in which the time-period threshold input from the selection circuit 20*b* is set, a counter that counts the number of sampled values falling below the determination threshold, and a detection processing unit (ST1 to ST8) that performs a detection process of occurrence of a power failure using these elements.

In the following, the operation of the detection processing unit (ST1 to ST8) is specifically explained. At ST1, it is monitored that the comparison result in the comparison circuit becomes (sampled value)<(determination threshold). When it is detected that (sampled value)<(determination threshold) (ST1: Yes), in synchronization with this timing, the time-period threshold input from the selection circuit 20*b* is set to the timer and the timer is started, the counter is incremented (ST2), and the comparison result for the next sampled value is monitored (ST3).

When (sampled value)<(determination threshold) is not satisfied as a result of monitoring at ST3 (ST3: No), the timer and the counter are reset (ST4) and the process moves to the above monitoring process at ST1. Moreover, when (sampled value)<(determination threshold) is satisfied as a result of monitoring at ST3 (ST3: Yes), the timer value is checked to determine whether the timer value is within the time period of the time-period threshold (ST5). When the timer value is not within the time period of the time-period threshold (ST5: No), the timer and the counter are reset (ST4) and the process moves to the above monitoring process at ST1.

On the other hand, when (sampled value)<(determination threshold) is satisfied (ST3: Yes) and the timer value is within the time period of the time-period threshold (ST5: Yes), the counter is incremented by one (ST6) and it is determined whether the count value has become a predetermined value (ST7). When the count value is not equal to the predetermined value (ST7: No), the process returns to ST3. When the repetition process from ST3 to ST7 is performed on consecutive sampled values, the count value becomes equal to the predetermined value (ST7: Yes), so that the power failure detection is output at this timing (ST8) and this procedure ends. The "predetermined value" is, by necessity, the number of times of sampling of two or more and is determined based on the "installation environment", the "sampling interval", the "time-period threshold", and so on. Moreover, the "time-period threshold" is determined, for example, based on the relationship between the detected voltage and the ripple cycle as shown in FIG. 7 and FIG. 8.

Figure 7:
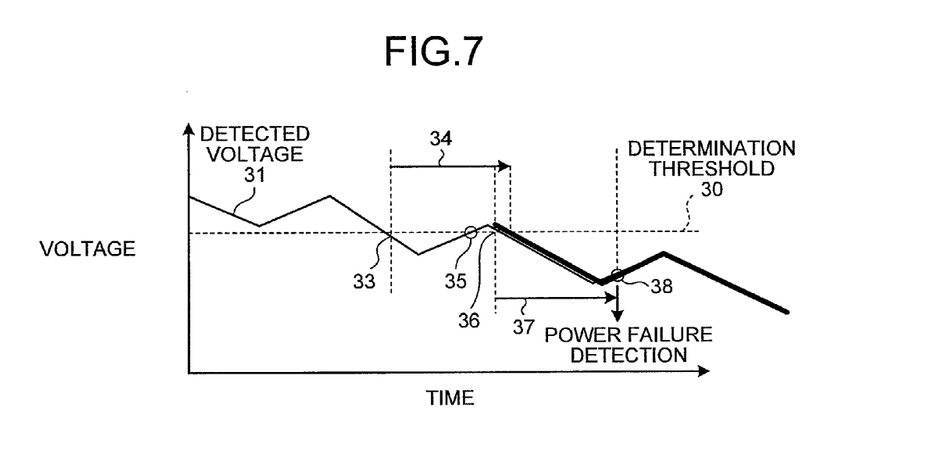
FIG. 7 is a time chart explaining an example of a power failure detecting operation when a time-period threshold longer than a ripple cycle of a detected voltage at the time of a power failure is selected.
Figure 8:
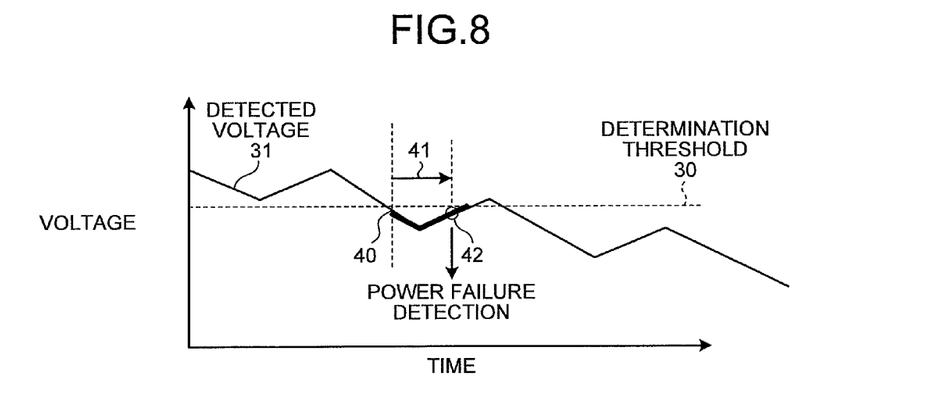
FIG. 8 is a time chart explaining an example of a power failure detecting operation when a time-period threshold shorter than a ripple cycle of a detected voltage at the time of power failure is selected.

Next, the power failure detecting operation by the procedure shown in FIG. 6 is explained to details with reference to FIG. 7 and FIG. 8. FIG. 7 is a time chart explaining an example of the power failure detecting operation when the time-period threshold longer than the ripple cycle of the detected voltage at the time of power failure is selected. FIG. 8 is a time chart explaining an example of the power failure detecting operation when the time-period threshold shorter than the ripple cycle of the detected voltage at the time of power failure is selected. FIG. 7 and FIG. 8 illustrate the relationship between a determination threshold 30 of a certain voltage value and a detected voltage 31 illustrated by a ripple waveform.

In FIG. 7, at a timing 33 at which the detected voltage 31 falls below the determination threshold 30 for the first time, a time-period threshold 34 longer than the ripple cycle of the detected voltage 31 is set to the timer and the timer is started, and a value 1 is set to the counter. The detected voltage 31 begins to rise within the time period of the time-period threshold 34, exceeds the determination threshold 30 at a timing 35, and falls below the determination threshold 30 at a timing 36 near the end of the time-period threshold 34. In this case, the timer and the counter are reset at the timing 35, so that the time-period threshold 34 disappears. Therefore, at the timing 36, the power failure detection is not performed, and a longer time-period threshold 37 is newly set to the timer and the timer is started, and a value 1 is set to the counter.

In the time period of this newly-set longer time-period threshold 37, the detected voltage 31 varies in a range equal to or below the determination threshold 30, so that the counter repeats counting up to a predetermined value. Even at an end timing 38 of the time-period threshold 37 at which the detected voltage 31 begins to rise, the detected voltage 31 is equal to or below the determination threshold 30 and the count value of the counter exceeds the predetermined value, so that an occurrence of power failure is detected.

In FIG. 8, at a timing 40 at which the detected voltage 31 falls below the determination threshold 30 for the first time, a time-period threshold 41 shorter than the ripple cycle of the detected voltage 31 is set to the timer and the timer is started, and a value 1 is set to the counter. The detected voltage 31 begins to rise within the time period of the time-period threshold 41, however, is below the determination threshold 30 even at an end timing 42 of the time-period threshold 41. During this period, the counter repeats counting up to the predetermined value. In this case, the count value of the counter exceeds the predetermined value at the end timing 42 of the time-period threshold 41, so that an occurrence of power failure is detected.

In this manner, when the time-period threshold longer than the ripple cycle is selected, the case occurs in which the peak of the ripple exceeds the determination threshold within the time period of the time-period threshold, so that occurrence of power failure cannot be detected in some cases. On the other hand, when the time-period threshold shorter than the ripple cycle is selected, even if there is a case in which the peak of the ripple exceeds the determination threshold, if the detected voltage is below the determination threshold within the time period of the time-period threshold, the power failure detection can be performed, so that it is possible to make the detection timing of power failure earlier than the difference between the time-period thresholds.

As above, according to the second embodiment, because the time-period threshold as an alternative to the voltage threshold can be selected according to the installation environment, so that, in the similar manner to the first embodiment, the abnormal end process in the case of an occurrence of power failure can be surely performed in any installation environment.

INDUSTRIAL APPLICABILITY

As above, the motor driving apparatus according to the present invention is useful as a motor driving apparatus capable of surely performing the abnormal end process in the case of an occurrence of power failure in which alternating-current power input is interrupted in any installation environment.

REFERENCE SIGNS LIST

1 MOTOR DRIVING APPARATUS
2 ALTERNATING-CURRENT POWER SOURCE
3 MOTOR (M)
4 MOTOR DRIVING CIRCUIT
5 VOLTAGE DETECTING CIRCUIT
6 CONTROL CIRCUIT
7 RECTIFIER CIRCUIT
8 SMOOTHING CIRCUIT
9 CONTROL VOLTAGE GENERATING CIRCUIT
10, 20 POWER-FAILURE DETECTION PROCESSING UNIT
10a VOLTAGE THRESHOLD GENERATING CIRCUIT
10b, 20b SELECTION CIRCUIT
10c, 20c COMPARISON AND DETERMINATION CIRCUIT
11 SWITCH
12 EXTERNAL EQUIPMENT SUCH AS FAN AND PUMP
20a TIME-PERIOD THRESHOLD STORING CIRCUIT

The invention claimed is:
1. A motor driving apparatus comprising:
a threshold providing circuit that is configured to provide a plurality of power failure detection thresholds determined based on characteristics of a device configured to connect to the motor driving apparatus;
a selection circuit that is configured to select a specified power failure detection threshold from the power failure detection thresholds; and
a comparison and determination circuit that is configured to determined presence or absence of an occurrence of power failure by comparing a detected voltage of an alternating-current (AC) power input to a motor driving circuit and the selected power failure detection threshold, wherein, when the device is connected, the device regenerates power during the power failure so that the voltage of the AC power input to the motor driving circuit during the power failure is greater than that when the device is disconnected, during a same time period.

2. The motor driving apparatus according to claim 1, wherein the power failure detection threshold is a voltage threshold, and the comparison and determination circuit, when the detected voltage falls below the voltage threshold, determines that a power failure has occurred.

3. The motor driving apparatus according to claim 1, wherein the power failure detection threshold is a time-period threshold, and the comparison and determination circuit, when the detected voltage falls below a determination threshold consecutively within a time period of the time-period threshold, determines that a power failure has occurred.

4. The motor driving apparatus according to claim 1, wherein the threshold providing circuit is configured to provide a first power failure detection threshold and a second power failure detection threshold greater than the first power failure detection threshold, and the selection circuit is configured to select the second power failure detection threshold when the device is connected to the motor driving apparatus and to select the first power failure detection threshold when the device is disconnected from the motor driving apparatus.

5. The motor driving apparatus according to claim 4, further comprising:

a switch which is connected to the selection circuit and is configured to be switchable between the first power failure detection threshold and the second power failure detection threshold.

* * * * *